(12) United States Patent
Rodbarry et al.

(10) Patent No.: US 7,474,639 B2
(45) Date of Patent: Jan. 6, 2009

(54) DYNAMIC UPDATE OF PUSH APPLICATIONS FOR WIRELESS DATA DEVICE

(75) Inventors: Glenn Rodbarry, Roselle, IL (US); Krsto S. Sitar, Cicero, IL (US)

(73) Assignee: Bank of America Corporation, Charlotte, NC (US)

( * ) Notice: Subject to any disclaimer, the term of this patent is extended or adjusted under 35 U.S.C. 154(b) by 622 days.

(21) Appl. No.: 10/907,903

(22) Filed: Apr. 20, 2005

(65) Prior Publication Data

US 2006/0239276 A1 Oct. 26, 2006

(51) Int. Cl.
*H04Q 7/24* (2006.01)
(52) U.S. Cl. .................... 370/328; 370/338; 370/401
(58) Field of Classification Search ............. 370/216, 370/328, 338, 401
See application file for complete search history.

(56) References Cited

U.S. PATENT DOCUMENTS 6,691,165 B1* 2/2004 Bruck et al. ............. 709/227
2002/0026482 A1* 2/2002 Morishige et al. ......... 709/206
2003/0208602 A1* 11/2003 Bhalla et al. .............. 709/227
2004/0199665 A1* 10/2004 Omar et al. ............... 709/238
2004/0259553 A1* 12/2004 Delaney et al. ........... 455/445
2005/0235046 A1* 10/2005 Carpenter ................. 709/219
2006/0050630 A1* 3/2006 Kobayashi et al. ........ 370/216

* cited by examiner

*Primary Examiner*—Steven H Nguyen
*Assistant Examiner*—Tito Pham
(74) *Attorney, Agent, or Firm*—Banner & Witcoff Ltd.; Michael Springs

(57) ABSTRACT

A system for pushing data to a wireless data device receives an identifier for the wireless data device and determines a corresponding gateway server by querying a mapping of wireless data device identifiers to wireless gateway servers. The system then submits a request to push the data to the wireless data device via the determined gateway server. If the gateway server rejects the request to push data to the wireless data device, the system repeatedly submits requests to push data to the wireless data device via a different gateway server until the request is accepted. The system then updates the mapping for the identifier of the wireless data device with the different gateway server which accepted the request to push data to the wireless data device.

19 Claims, 3 Drawing Sheets

US 7,474,639 B2

DYNAMIC UPDATE OF PUSH APPLICATIONS FOR WIRELESS DATA DEVICE

FIELD OF THE INVENTION

One embodiment of the present invention is directed to a wireless gateway server for wireless data devices. More particularly, one embodiment of the present invention is directed to the dynamic update of push applications for wireless data devices to account for changes in device mappings in wireless gateway servers.

BACKGROUND INFORMATION

Wireless data devices, such as the BlackBerry handheld device from RIM Corporation, have proliferated in recent years. The popularity of these devices is based on their ability to receive e-mail and other data remotely so that the user can always be "in touch" with the office.

Many of these devices have a "push" architecture that eliminates the hassles of the traditional "pull" devices, in which the user must periodically connect to an e-mail server to check for new messages, or click on an embedded Web link to receive data. In contrast, with a push device, e-mail messages and other data such as documents are automatically routed to the handheld device, without the active participation of the user.

In large corporate or government environments, there are typically multiple wireless gateway servers that allow for communication from networked-based applications to wireless data devices. A wireless data device is typically provisioned on only one of the multiple wireless gateway servers. The application software which pushes messages to the wireless data device must either know, or determine, which wireless gateway server to use in order to forward a message to a particular user's wireless data device.

However, due to network growth or management, the provisioning of the wireless data devices on a particular wireless gateway server may change, requiring the application software which pushes data to wireless devices to adjust accordingly. Currently, known wireless data device push applications require manual revisions to adjust for changes, which is time consuming and can introduce human error into the process.

Based on the foregoing, there is a need for a system and method for automatically adjusting for changes in the mapping/provisioning of wireless data devices to wireless gateway servers.

SUMMARY OF THE INVENTION

One embodiment of the invention is a system for pushing data to a wireless data device. The system receives an identifier for the wireless data device and determines a corresponding gateway server by querying a mapping of wireless data device identifiers to wireless gateway servers. The system then submits a request to push the data to the wireless data device via the determined gateway server. If the gateway server rejects the request to push data to the wireless data device, the system repeatedly submits requests to push data to the wireless data device via a different gateway server until the request is accepted. The system then updates the mapping for the identifier of the wireless data device with the different gateway server which accepted the request to push data to the wireless data device.

DETAILED DESCRIPTION

One embodiment of the present invention is a wireless data device system and application that automatically detects the provisioning of a wireless data device on a particular wireless gateway server, and provides for changes to the provisioning. As a result, pushes of data to the wireless data device are optimized.

Figure 1:
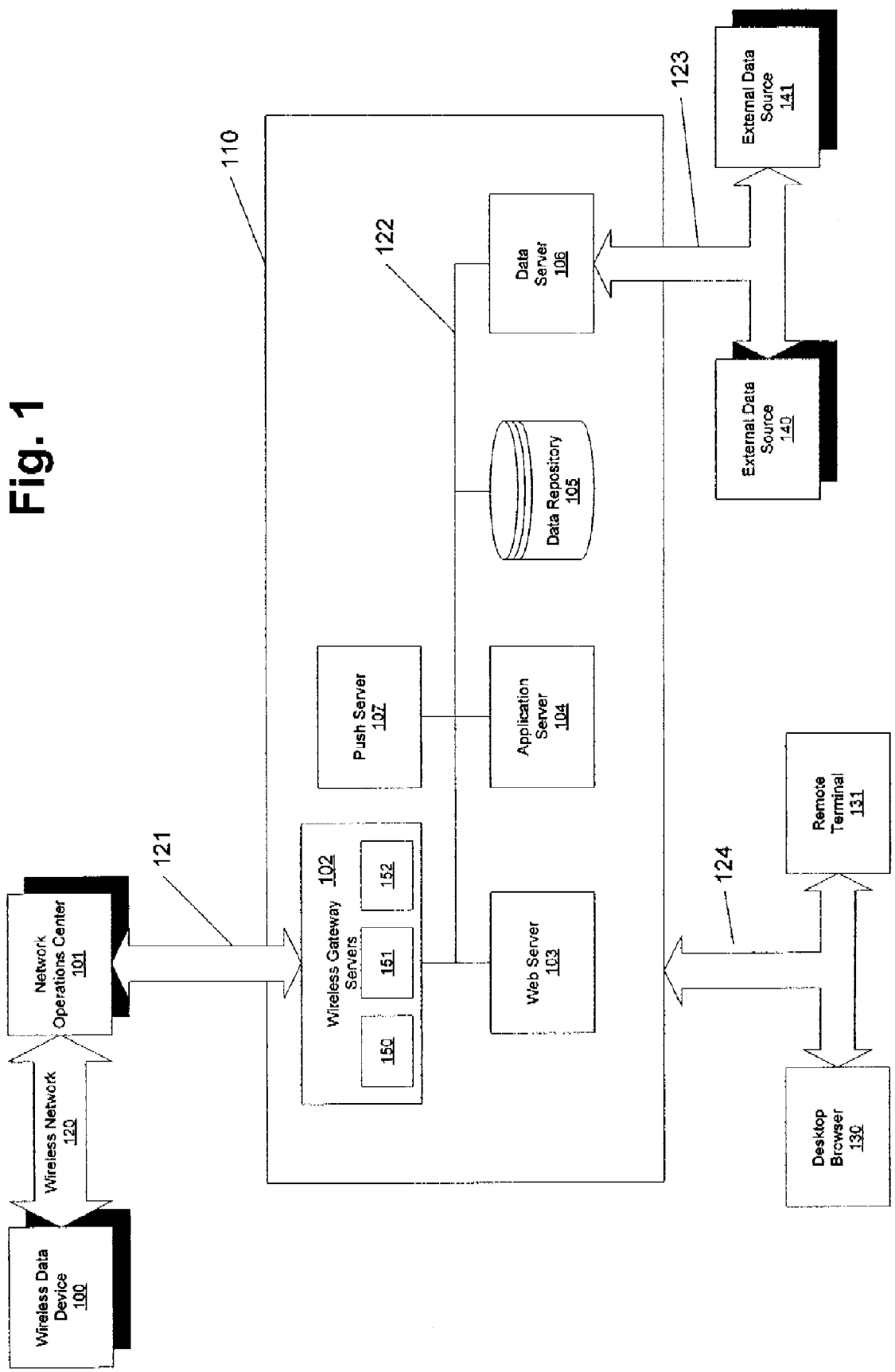
FIG. 1 is a block diagram of the functional elements of a system for detecting and modifying the provisioning of a wireless data device on a particular wireless gateway server in accordance with one embodiment of the present invention.

FIG. 1 is a block diagram of the functional elements of a system 110 for detecting and modifying the provisioning of a wireless data device on a particular wireless gateway server in accordance with one embodiment of the present invention. The functional elements shown in FIG. 1 can be implemented with any combination of hardware or software, including software executed by multiple computer systems or servers.

System 110 includes a wireless gateway 102 that includes one or more wireless gateway servers 150-152 that take electronic information produced by system 110 and makes it compatible for transmission across a wireless network 120 by encoding it in transmission protocols applicable to wireless network 120. Wireless gateway servers 150-152 communicate this electronic data to a network operations center 101 across a communications network 121. Network operations center 101 monitors and manages various computer systems which interface to a carrier's wireless network 120. The wirelessly transmitted electronic information is received and displayed by a wireless data device 100.

In one embodiment, wireless data device 100 is a BlackBerry handheld device from RIM Corporation, and wireless gateway servers 150-152 are BlackBerry Enterprise Servers executing Mobile Data Service. However, other types of wireless data devices and gateway servers can be used in different embodiments of the present invention.

System 110 further includes a Web server 103 that in one embodiment includes multiple web servers and one or more load balance servers. Web server 103 receives and interprets electronic messages encoded in various internet-compatible protocols, such as HyperText Transfer Protocol ("HTTP") or File Transfer Protocol ("FTP").

An application server 104 includes one or more application programs running on one or more application servers in a clustered environment. Application server 104 contains business rules and program logic, responds to user requests and processes and formats data in a manner consistent with wireless data device 100.

System 110 further includes a push server 107 that optimizes the use of multiple wireless gateway servers 150-152. In one embodiment, the number of wireless data devices 100 in communication with wireless gateway servers 150-152 can number in the thousands, and each are provisioned on a particular wireless gateway server from the set of multiple wireless gateway servers 150-152. In one embodiment, the functionality of push server 107 may be provided on the same server as application server 104, or may exist on servers which are distinct from application server 104.

A data repository 105 provides long-term data storage for system 110. The storage may take the form of relational or hierarchical databases, sequential flat file storage, or any other method that allows data to be stored and retrieved.

A data server 106 allows system 110 to interface with one or more independent external data sources 140 and 141 that provide raw data or processed information, via a communications network 123. External data source systems 140 and 141 may represent computer data systems such as 3rd party financial or market data systems, news services, or any other source of electronic data that may be transformed and represented in a wireless markup language format or other format for display on wireless data device 100. In one embodiment, the electronic pushed data is formatted in accordance with the "Push Access Protocol" of the "Wireless Application Protocol".

A desktop computer browser 130 or remote terminal 131 in one embodiment can be used to dynamically manage various system 110 elements via a communications link 124. These management functions can include viewing and altering configuration values for system 110 elements or viewing of diagnostic files or real-time data and statistics.

Communications networks 121, 122, 123, and 124 may be one or more hardwired digital or analog communications links, wireless digital or analog communications links, or any combination thereof, or utilize any other methods for establishing and operating communications links.

In one embodiment of system 110, data can be received by wireless data device 100 in two ways: (1) "pull", which involves the user explicitly requesting the data by, for example, clicking on a link in a microbrowser; and (2) "push", which involves the user registering to receive data to be sent in the future. With push, the data is delivered to wireless data device 100 without further intervention by the user. The data may be automatically gathered and sent on a regularly scheduled or sporadic basis or it may be published by human intervention and sent to registered users on a regular or sporadic basis.

In order for wireless data device 100 to receive pushed data, in one embodiment it is provisioned on one of wireless gateway servers 150-152. The wireless gateway server takes data intended for wireless data device 100 (identified by a unique identifying number or identifier, sometimes called a "PIN") from, for example, data server 106, and forwards the data and PIN to network operations center 101. Network operations center 101 then handles transmitting the message over wireless network element 120 to the wireless data device 100 that matches the PIN.

In an embodiment where wireless data device 100 is provisioned on a single, particular wireless gateway server 150-152, push server 107 has to either know or determine which of wireless gateway servers 150-152 to forward a message to for a particular user's PIN. To facilitate this knowledge, push server 107 maintains a PIN/wireless gateway server map that maps each PIN to its respective gateway server.

In operation, a user registers to receive data to be published and delivered in the future. Registration can occur by the user submitting a request to application server 104 via wireless data device 100. Application server 104 stores what data the user wishes to receive, as well as the matching PIN for wireless data device 100, in data repository 105.

For multiple reasons, the assignment of a wireless data device to one particular wireless gateway server 150-152 of wireless gateway 102 may change. For example, one of wireless gateway servers 150-152 may change because the server becomes non-responsive to service requests, its name is changed by network administrators, it is removed from service, or a new wireless gateway server could be added to wireless gateway 102 due to capacity issues.

Figure 2:
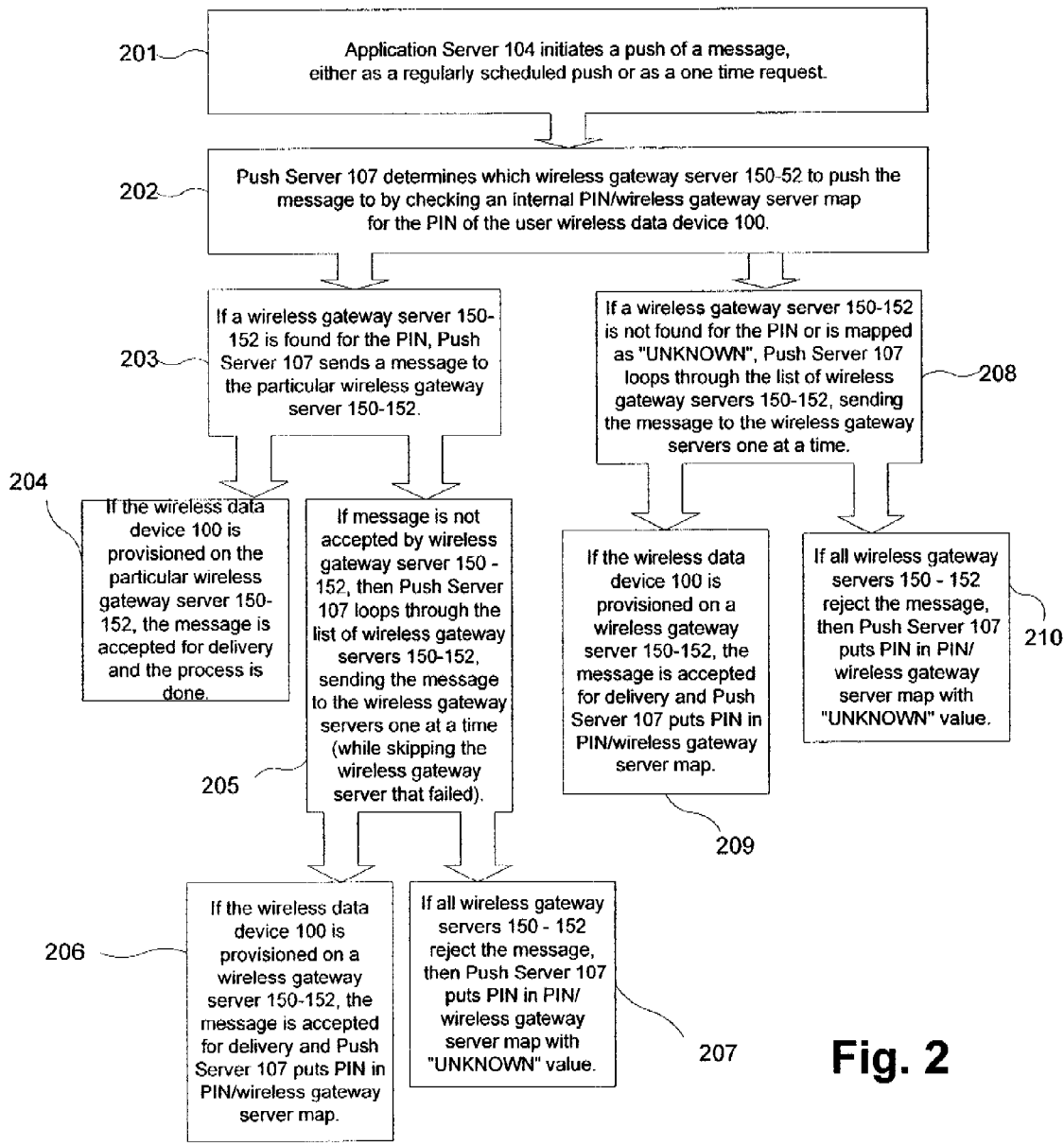
FIG. 2 is a flow diagram of the functionality performed by the system to respond to changes in the mapping of wireless data device PINs to wireless gateway servers in accordance with one embodiment of the present invention.

FIG. 2 is a flow diagram of the functionality performed by system 110 to respond to changes in the mapping of wireless data device PINs to the wireless gateway servers 150-152 in accordance with one embodiment of the present invention. In one embodiment, the functionality is implemented by software stored in memory and executed by a processor. In other embodiments, the functionality can be performed by hardware, or any combination of hardware and software.

201: Application server 104 initiates a push of data, such as a document in the form of a message, either as a regularly scheduled push or as a one time request, by sending a push request to push server 107 using communication link 122.

202: Push server 107 determines which wireless gateway server 150-152 of wireless gateway 102 to push the message to by querying/searching the PIN/wireless gateway server map for the PIN and corresponding gateway server mapping of wireless data device 100.

203: If a wireless gateway server 150-152 is found for the PIN, push server 107 sends a message to the mapped wireless gateway server using communication link 122.

204: If the wireless data device 100 is provisioned on the mapped wireless gateway server 150-152, then the message is accepted for delivery to the wireless data device 100 and the process is done. System 110 determines that the message was successfully accepted in one embodiment by receiving a status code of success on the message submission.

205: If the push of the message is not accepted by the mapped wireless gateway server 150-152, then push server 107 loops through the list of wireless gateway servers 150-152 of wireless gateway 102 by sending the message to each of the servers 150-152 one at a time, while skipping the server that failed at the beginning of block 205.

206: If the wireless data device 100 is provisioned on a wireless gateway server 150-152, the message is accepted for delivery and push server element 107 updates the PIN/wireless gateway server map with the correct gateway server for the PIN. System 110 determines that the message was successfully accepted in one embodiment by receiving a status code of success on the message submission. This function provides system 110 with an automated recovery from wireless data device 100 provisioning from one wireless gateway server to another in wireless gateway 102.

207: If all wireless gateway servers 150-152 reject the message, then push server 107 updates the PIN/wireless gateway server map with an "UNKNOWN" value for the server corresponding to the PIN of wireless data device 100.

208: If a wireless gateway server 150-152 in wireless gateway 102 is not found for the PIN, push server 107 loops through the list of wireless gateway servers 150-152, sending the message to the wireless gateway servers one at a time.

209: If the wireless data device 100 is provisioned on a wireless gateway server 150-152, the message is accepted for delivery and push server 107 updates the PIN/wireless gateway server map with the correct gateway server for the PIN. System 110 determines that the message was successfully accepted in one embodiment by receiving a status code of success on the message submission. This function provides system 110 with automated detection of a new wireless data device 100 being provisioned for the first time on a wireless gateway server 150-152 in wireless gateway 102.

210: If all wireless gateway servers 150-152 reject the message, then push server 107 updates the PIN/wireless gateway server map with an "UNKNOWN" value for the server corresponding to the PIN of wireless data device 100.

Through the use of the PIN/wireless gateway server map, the correct wireless gateway server 150-152 for a PIN is more likely to be chosen by push server 107, thereby optimizing pushes of data to wireless data device 100. Further, changes in server assignments are self-correcting by system 110 through the automated updates of the PIN/wireless gateway server map.

In one embodiment of the invention, at any point before a scheduled or sporadic push of data, a system administrator may dynamically update the list of valid wireless gateway servers 150-152 that make up wireless gateway 102 by using desktop browser 130 or remote terminal 131. The list of valid wireless gateway servers may be stored in computer volatile memory on push server 107 for optimized retrieval, as well as in data repository 105 to span shutdowns of push server 107.

Figure 3:
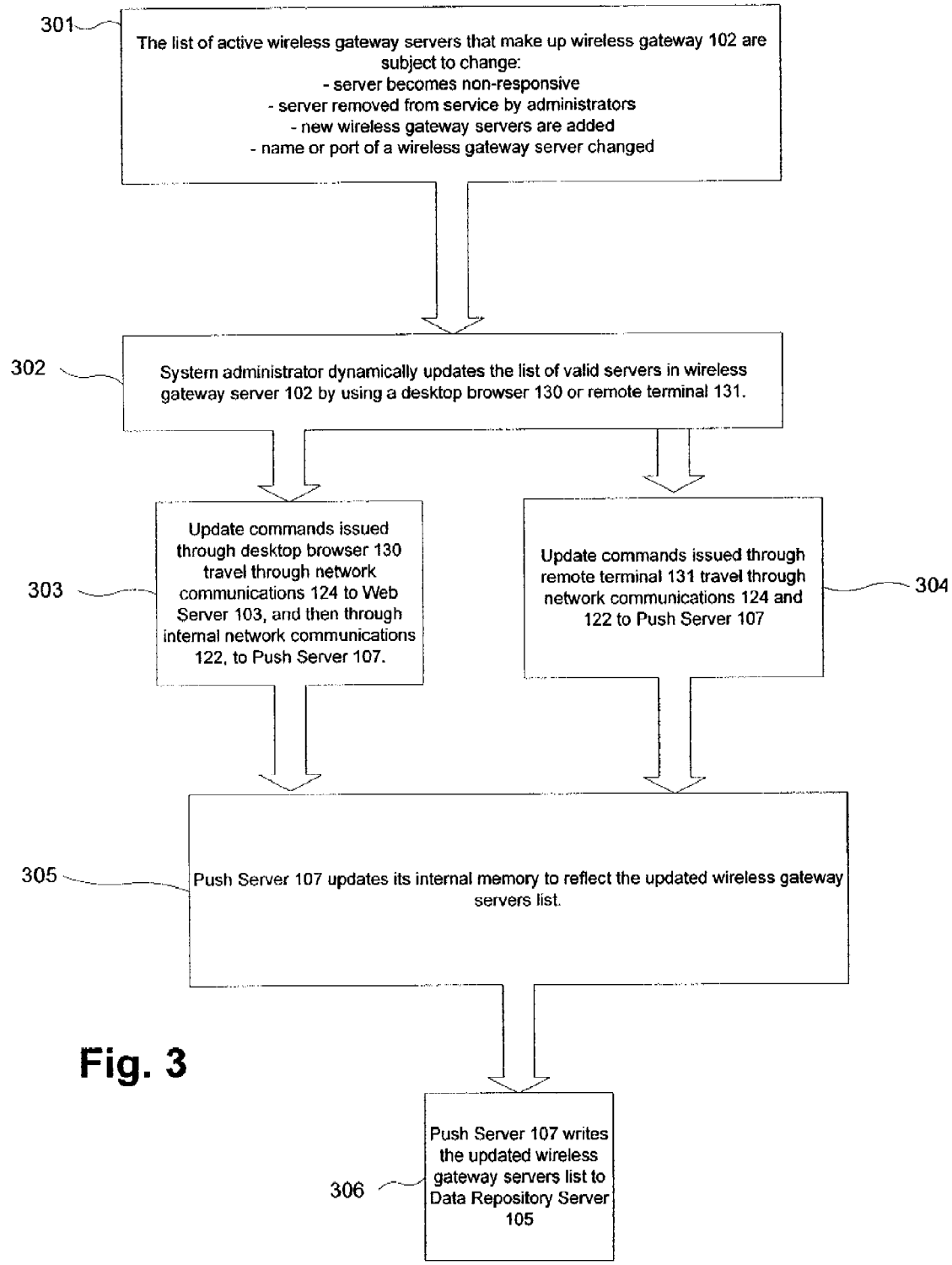
FIG. 3 is a flow diagram of the functionality performed by the system to respond to changes in wireless gateway.

Dynamic maintenance of the list of valid wireless gateway servers that make up wireless gateway 102 avoids service disruptions of system 110 due to wireless gateway server name changes, additions and removals. FIG. 3 is a flow diagram of the functionality performed by system 110 to respond to changes in wireless gateway 102. In one embodiment, the functionality is implemented by software stored in memory and executed by a processor. In other embodiments, the functionality can be performed by hardware, or any combination of hardware and software.

301: The list of wireless gateway servers 150-152 of wireless gateway 102 may change. For example, one of wireless gateway servers 150-152 may change because the server becomes non-responsive, the server is removed from service or a new wireless gateway server could be added to wireless gateway 102 due to capacity issues, or the name or port of a wireless gateway server may change.

302: A system administrator dynamically updates the list of valid servers in wireless gateway 102 by using desktop browser 130 or remote terminal 131.

303: Update commands issued through desktop browser 130 travel through network communications 124 to Web server 103, and then through network communications 122, to push server 107.

304: Update commands issued through remote terminal 131 travel through network communications 124 and 122 to push server 107.

305: Push server 107 updates its internal memory to reflect the updated wireless gateway servers list.

306: Push server 107 writes the updated wireless gateway servers list to data repository 105.

As described, embodiments of the present invention dynamically maintain a mapping of PIN/wireless gateway server so that an application can optimally push data to the correct server for a selected PIN. Pushes of data are thus more efficient and user intervention is not required to account for changes in mapping.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of pushing data to a wireless date device, said method comprising:
receiving an identifier for the wireless data device;
determining a first gateway server of a plurality of gateway servers by querying mapping data, wherein the first gateway server corresponds to the identifier;
submitting a request to push data to the wireless data device via the first gateway server;
if the first gateway server rejects the request to push data to the wireless data device, iteratively submitting the request to push data to the wireless data device via a next gateway server of the plurality of gateway servers until the next gateway server accepts the request to push data to the wireless data device; and
updating the mapping data for the identifier with a second gateway server if the request to push data to the wireless data device was accepted by the next gateway server, wherein the second gateway server is the next gateway server that accepted the request to push data to the wireless data device.

2. The method of claim 1, further comprising:
updating the mapping data for the identifier to indicate that a gateway server corresponding to the wireless data device is unknown if the request to push data to the wireless data device was rejected by the all of the next gateway servers.

3. The method of claim 1, wherein the mapping data stores a plurality of wireless data device identifiers and for each wireless data device identifier the corresponding gateway server that the wireless data device is provisioned on.

4. The method of claim 1, further comprising:
dynamically updating a list of the plurality of gateway servers to valid gateway servers.

5. The method of claim 1, wherein the plurality of gateway servers form a wireless gateway for the wireless data device.

6. The method of claim 1, wherein the wireless data device is provisioned on one of the plurality of gateway servers.

7. A system for pushing data to a wireless data device, said system comprising:
means for receiving an identifier for the wireless data device;
means for determining a first gateway server of a plurality of gateway servers by querying mapping data, wherein the first gateway server corresponds to the identifier;
means for pushing the data to the wireless data device via the first gateway server;
if the request to push data to the wireless data device is rejected by the first gateway server, means for iteratively submitting the request to push data to the wireless data device via a next gateway server of the plurality of gateway servers until the next gateway server accepts the request to push data to the wireless data device; and
means for updating the mapping data for the identifier with a second gateway server, wherein the second gateway server is the next gateway server that accepted the request to push data to the wireless data device.

8. The system of claim 7, further comprising:
means for dynamically updating a list of the plurality of gateway servers to valid gateway servers.

9. A computer readable medium having instructions stored thereon that, when execute by a processor, cause the processor to:
receive a request to push data to a wireless data device;
query a mapping of wireless data devices and corresponding gateway servers to determine a first gateway server for the wireless data device;
send the request to push data to the first gateway server of a plurality of gateway servers;

determine if the request to push data to was accepted by the first gateway server;

if the request to push data to the wireless data device was rejected by the first gateway server, iteratively submit the request to push the data to the wireless data device via a next gateway server of the plurality to gateway servers until the request to push data to the wireless data device is acceptable by the next wireless gateway server; and update the mapping for the wireless data device to a second gateway server, wherein the second gateway server is the next gateway server which accepted the request to push data to the wireless data device.

10. The computer readable medium of claim 9, said instructions further causing said processor to:

update the mapping for the wireless data device to indicate that a gateway server corresponding to the wireless data device is unknown if the request to push data to the wireless data device via the next gateway server is not accepted.

11. The computer readable medium of claim 9, wherein the mapping stores a plurality of wireless data device identifiers and for each wireless data device identifier the corresponding gateway server that the wireless data device is provisioned on.

12. The computer readable medium of claim 9, said instructions further causing said processor to:

dynamically update a list of the plurality of gateway servers to valid gateway servers.

13. The computer readable medium of claim 9, wherein the plurality of gateway servers form a wireless gateway for the wireless data device.

14. The computer readable medium of claim 9, wherein the wireless data device is provisioned on one of the plurality of gateway servers.

15. A method of transmitting data to a wireless data device comprising:

storing a mapping of a plurality of identifiers of wireless data devices and corresponding gateway servers;

receiving a request to push a message to the wireless data device;

querying the mapping to retrieve a first gateway server of a plurality of gateway servers;

sending the message to the first gateway server for transmitting to the wireless data device;

if the message to transmit data to the wireless data device is not accepted by the gateway server, iteratively sending the message to an additional gateway server of the plurality of gateway servers until the message to transmit data to the wireless data device is accepted by a wireless gateway server; and updating the mapping for the wireless data device based on the additional gateway server that resulted in the message being accepted for transmission to the wireless data device.

16. The method of claim 15, further comprising:

updating the mapping for the wireless data device to indicate that a gateway server corresponding to the wireless data device is unknown if the request to transmit data to the wireless data device is rejected by the additional gateway servers.

17. The method of claim 15, wherein the plurality of gateway servers form a wireless gateway for the wireless data device.

18. The method of claim 15, wherein the wireless data device is provisioned on one of the plurality of gateway servers.

19. The method of claim 17, wherein the wireless data device is wirelessly coupled to the wireless gateway.

* * * * *